United States Patent [19]

Schwyter et al.

[11] Patent Number: 4,659,118
[45] Date of Patent: Apr. 21, 1987

[54] PIPE SEAL CONNECTION BETWEEN CONFRONTING ENDS OF TWO COAXIAL RELATIVELY ROTATABLE PIPES

[75] Inventors: Anton Schwyter, Buonas; Heinrich Amsler, Baar, both of Switzerland

[73] Assignee: Stopinc Aktiengesellschaft, Baar, Switzerland

[21] Appl. No.: 847,780

[22] Filed: Apr. 3, 1986

[30] Foreign Application Priority Data

Apr. 30, 1985 [DE] Fed. Rep. of Germany ....... 3515494

[51] Int. Cl.$^4$ .............................................. F16L 9/14
[52] U.S. Cl. ...................................... 285/55; 285/281; 285/332.2; 285/337; 285/339; 285/363
[58] Field of Search ...................... 285/332.2, 55, 281, 285/339, 337, 363

[56] References Cited

U.S. PATENT DOCUMENTS

| | | | |
|---|---|---|---|
| 1,270,300 | 6/1918 | King et al. | 285/337 |
| 3,284,106 | 11/1966 | McIntosh et al. | 285/55 |
| 3,479,059 | 11/1969 | Taylor et al. | 285/55 |
| 3,623,751 | 11/1971 | Hulbert | 285/55 |
| 3,927,960 | 12/1975 | Endersen | 285/55 X |

Primary Examiner—Dave W. Arola
Attorney, Agent, or Firm—Wenderoth, Lind & Ponack

[57] ABSTRACT

A pipe seal connection defines the seal between confronting pipe ends of two pipes which are coaxial and rotatable relative to each other. The confronting pipes ends are provided with spaced conical surfaces forming therebetween an annular slot which widens radially outwardly. An annular seal ring is positioned within the annular slot. A clamping band circumferentially surrounds the annular sealing ring and presses the sealing ring radially inwardly into contact with the spaced conical surfaces.

17 Claims, 1 Drawing Figure

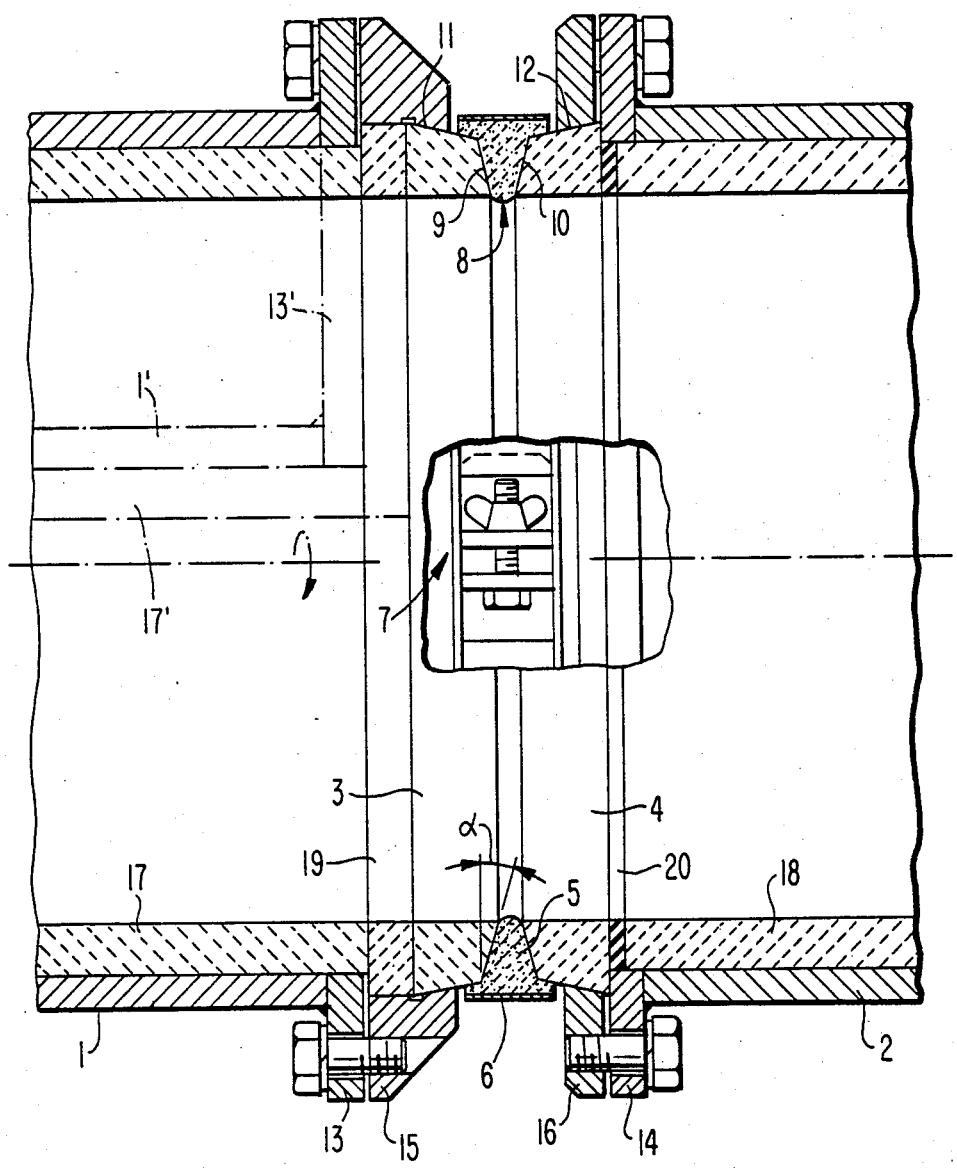

PIPE SEAL CONNECTION BETWEEN CONFRONTING ENDS OF TWO COAXIAL RELATIVELY ROTATABLE PIPES

BACKGROUND OF THE INVENTION

The present invention relates to a pipe seal connection between confronting ends of two pipes which are mounted coaxially of each other and which are rotatable relative to each other and axially immovable relative to each other. More particularly, the present invention is directed to such a pipe seal connection which provides a seal to protect against a molten material passing through, particularly molten metals. Furthermore, the present invention is directed to an assembly including two such coaxially and relatively rotatably mounted pipes, such assembly being improved to include the pipe seal connection of the present invention.

Pipe seal connections of this type are required, for example, for certain applications in pipeline systems for molten metals, particularly molten aluminum. For example, in a sliding closure unit of the rotary type (such as disclosed in EP No. 0,040,692) having a discharge pipe executing a rotary movement when the sliding closure unit is actuated, the molten material must be guided by such rotary pipe into a stationary pipe. A pipe seal connection between two such pipes must permit relative rotation therebetween while ensuring a seal therebetween. Further, such connection must be constructed in a manner such that temporary freezing of the molten material or any incrustations do not adversely affect operation of the connection. In this regard, it must be kept in mind that molten materials, and particularly molten metals, generally are transported and used at temperatures only slightly above the respective melting points, for which reasons such materials tend to freeze or solidify.

SUMMARY OF THE INVENTION

Accordingly, it is an object of the present invention to provide a pipe seal connection which satisfies the above and other operational requirements. It is a further object of the present invention to provide an assembly including two pipes mounted coaxially with respect to each other and relatively rotatable with respect to each other, such assembly including an improved pipe seal connection satisfying the above and other requirements.

These objects are achieved in accordance with the present invention by the provision of means at confronting pipe ends of the two pipes defining spaced conical surfaces forming therebetween an annular slot which widens radially outwardly. An annular sealing ring is positioned within the annular slot, and clamping means circumferentially surrounds the annular sealing ring to press the sealing ring radially inwardly into contact with the spaced conical surfaces.

This arrangement of the present invention creates a practically completely smooth continuous transition on the inside of the pipe assembly. Such connection of the present invention not only makes possible any desired relative rotary movements of the pipes in opposite directions, but also permits to a certain extent any necessary radial and axial positional changes and temperature initiated movements between the two pipes. The seal connection is easy to position and release and permits the two pipes to be mounted and dismounted radially, i.e. that is without axial movement. Even further, such seal connection is sufficiently gas-tight to maintain an atmosphere of protective gas, for example, around a molten metal, without excessive leakage losses. In accordance with a preferred feature of the present invention, each conical surface is inclined with respect to a radius of the respective pipe at an angle of from 12° to 25°, and further preferrably at an angle of from 15° to 20°. Such inclination results in advantageous conditions with regard to distribution of pressure inwardly of the sealing ring and its contact on the conical surfaces forming the annular slot.

In a preferred arrangement, the clamping means is in the form of a clamping band surrounding the sealing ring, and a tensioning element for tightening and loosening, selectively, the clamping band about the sealing ring. This feature of the invention facilitates positioning and release of the seal connection.

In accordance with a further feature of the present invention, the conical surfaces are defined on respective end rings releasably mounted on the confronting pipe ends. Each end ring has thereon a second conical surface. A centering flange, for each pipe end, has an inner conical surface complementary to and abutting the second conical surface of the respective end ring. Each centering flange is axially movable toward the respective pipe end, thereby insuring a tight fit of the end rings to the respective pipe ends. Each pipe may be provided with an internal lining, and the end rings have inner diameters equal to the inner diameters of the respective internal linings. In a particularly preferred arrangement, the internal linings and the end rings are formed of material which is resistant, particularly temperature resistant, to the particular molten material to be passed through the pipes. These features of the present invention particularly are advantageous when the molten material is to be completely separated from the metal material of the pipes.

BRIEF DESCRIPTION OF THE DRAWING

Other objects, features and advantages of the present invention will be apparent from the following detailed description of a preferred embodiment thereof, with reference to the accompanying drawing, wherein:

The single FIGURE is an axial section through a pipe assembly including the pipe seal connection of the present invention, with a portion of a clamping structure being shown in detailed elevation.

DETAILED DESCRIPTION OF THE INVENTION

Illustrated in the drawing is an approximately horizontally mounted arrangement of two pipes 1, 2, for example formed of steel and provided with respective temperature resistant internal jackets 17, 18 for conducting a molten material, for example a molten metal such as aluminum. Pipe 2 is stationarily mounted, and pipe 1 is rotatable about its longitudinal axis. It particularly is contemplated in accordance with the present invention that pipe 1 may be the discharge pipe of a rotary sliding closure unit (not shown) for example in accordance with EP No. 0,040,692. However, the present invention is not intended to be limited to such specific application.

End rings 3, 4 are mounted at the respective confronting ends of pipes 1, 2. End rings 3, 4 are conically chamfered or beveled on their facing ends to define spaced conical surfaces 9, 10 forming therebetween an annular slot 8 having a somewhat V-shaped cross section, i.e.

widening radially outwardly. An annular sealing ring 5 is positioned within and fills annular slot 8. Sealing ring 5 is pressed radially inwardly and deformed into slot 8, thereby sealingly contacting conical surfaces 9, 10. This radial pressure is exerted by clamping means circumferentially surrounding sealing ring 5, and in the illustrated arrangement in the form of a metallic clamping band 6 and a tensioning structure 7 for tightening clamping band 6 about the exterior of sealing ring 5. Thus, when tensioning structure 7 is opened, clamping band 6 easily can be removed and replaced over the outer pipe diameter.

Sealing ring 5 may be formed of a jacketed cable of ceramic fibers, for example with a core of aluminum-silicon fibers, and a woven jacket of glass fibers. This material is resistant to molten aluminum and is particularly suitable as a deformable sealing material. However, the present invention is not intended to be limited to such specific material, and those skilled in the art readily would understand what other materials could be employed for achieving the sealing function of the present invention, as described herein, and providing resistant properties to the particular molten material involved.

The angle of inclination of surfaces 9, 10 is of some significance in accordance with the present invention, and specifically to insure that annular slot 8 is filled with sealing ring 5 and that sealing ring 5 snugly fits on surfaces 9, 10 even when positional changes therebetween occur during operation. It particularly has been determined that when each conical surface is inclined from a radius of the respective pipe at an angle α equal to from 12° to 25°, especially from 15° to 20°, performance is quite suitable.

The seal connection structure of the present invention provides high reliability of sealing even during positional changes between the two pipes, and this is ensured even at a relatively slight pressure exerted on sealing ring 5. Thus, reaction forces on rotating pipe 1 and therewith any damaging forces on the sliding closure unit connected thereto are slight.

In the above-described and illustrated arrangement, sealing ring 5 will slide along both end rings 3, 4 when pipe 1 is rotated. If this is not desired however, a simple stop (not shown) may be provided between one pipe and clamping band 6, thereby resulting in an arrangement whereby relative rotation occurs only between the sealing ring and the end ring of the other pipe.

End rings 3, 4 further are provided with respective second conical surfaces 11, 12 which are much less sharply inclined with respect to the coaxial axes of the pipes than are first conical surfaces 9, 10. These conical surfaces are provided to cooperate with complementary, abutting inner conical surfaces of respective centering flanges 15, 16 to insure fastening of rings 3, 4. Centering flanges 15, 16 are axially tensioned or pressed toward the respective confronting ends of pipes 1, 2, for example by being bolted to respective pipe flanges 13, 14 fixed to respective pipes 1, 2. The end rings 3, 4 are circumferentially held by the respective centering flanges 15, 16. This provides the advantage that end rings 3, 4 can be safely formed of a suitable temperature resistant material, for example a refractory material which is relatively brittle and which tends to form cracks.

End rings 3, 4 have the same inner diameters as internal jackets or linings 17, 18. This arrangement creates a substantially smooth transition between the two pipes for the molten material to pass therethrough. An intermediate ring 19 is provided at the end of pipe 1 and extends radially outwardly somewhat over flange 13. Ring 19 has a machined front surface contacting end ring 3, and by this arrangement intermediate ring 19 is tensioned between end ring 3 and jacket or lining 17. End ring 4 rests on flange 14, and any slot present between end ring 4 and jacket or lining 18 can be bridged or filled with a compressible annular ring 20 or plugged with a padding of ceramic fiber material.

Internal jackets or linings 17, 18 are intended to protect the walls of pipes 1, 2 from contact with the molten material being passed therethrough and therefore should be resistant to such molten material. In the case of molten aluminum, internal linings 17, 18 may be fomed of a mixture of short ceramic fibers, for example of calcium-silicon, compressed with a binder. End rings 3, 4 and intermediate ring 19 can be formed of the same or similar material. However, if required, a material of greater strength can be employed for end rings 3, 4, for example aluminum titanate or a calcined high-alumina material. These materials however are examples only, and one skilled in the art readily would understand what other material may be employed for such components of the present invention.

The two pipes 1, 2 to be connected do not necessarily have to have the same diameter. Thus, as indicated in the drawing by dashed lines, a pipe 1' may have a much smaller diameter than pipe 2. In such an arrangement, flange 13' connected to pipe 1' is widened radially. Also, intermediate flange 19 is widened radially to cover the front of flange 13' and to form a connection with internal jacket or lining 17'.

Although the present invention has been described and illustrated with respect to preferred features thereof, it is to be understood that various modifications and changes may be made to the specifically described and illustrated features without departing from the scope of the present invention.

What is claimed is:

1. In an assembly including two pipes mounted coaxially with respective pipe ends confronting each other, said two pipes being mounted for relative movement therebetween rotatably but being relatively substantially immovable axially and passing therethrough a molten material, the improvement of means defining a seal between said confronting pipe ends without moving said pipe ends axially toward each other, said seal defining means comprising:
    means at said confronting pipe ends defining spaced conical surfaces forming therebetween an annular slot which widens radially outwardly;
    an annular sealing ring positioned within said annular slot; and
    clamping means, circumferentially surrounding said annular sealing ring, for adjustably pressing said sealing ring radially inwardly into sealing contact with said spaced conical surfaces.

2. The improvement claimed in claim 1, wherein each said conical surface is inclined from a radius of the respective said pipe at an angle of from 12° to 25°.

3. The improvement claimed in claim 2, wherein said angle is from 15° to 20°.

4. The improvement claimed in claim 1, wherein said clamping means comprises a clamping band surrounding said sealing ring, and a tensioning means for tightening said clamping band about said sealing ring.

5. The improvement claimed in claim 1, wherein said means defining said conical surfaces comprise end rings releasably mounted on respective said pipe ends, said end rings having thereon respective said conical surfaces.

6. The improvement claimed in claim 5, wherein each said end ring has thereon a second conical surface, and further comprising, for each said pipe end, a centering flange having an inner conical surface complementary to and abutting said second conical surface of the respective said end ring, and means for pressing each said centering flange axially toward the respective said pipe end.

7. The improvement claimed in claim 5, wherein each said pipe has an internal lining, and said end rings have inner diameters equal to inner diameters of respective said internal linings.

8. The improvement claimed in claim 7, wherein said internal linings and said end rings are formed of material which is resistant to molten material passing through said pipes.

9. A pipe seal connection for defining a seal between confronting pipe ends of two pipes which are coaxial relative to each other and which are mounted for relative movement rotatably but are relatively substantially immovable axially, without moving the pipe ends axially toward each other, said connection comprising:
 means for defining at the confronting pipe ends spaced conical surfaces forming therebetween an annular slot which widens radially outwardly;
 an annular sealing ring positioned within said annular slot; and
 clamping means, circumferentially surrounding said annular sealing ring, for adjustably pressing said sealing ring radially inwardly into sealing contact with said conical surfaces.

10. A connection as claimed in claim 9, wherein each said conical surface is inclined from a radius of the respective pipe at an angle of from 12° to 25°.

11. A connection as claimed in claim 10, wherein said angle is from 15° to 20°.

12. A connection as claimed in claim 9, wherein said clamping means comprises a clamping band surrounding said sealing ring, and a tensioning means for tightening said clamping band about said sealing ring.

13. A connection as claimed in claim 9, wherein said means defining said conical surfaces comprise end rings adapted to be releasably mounted on respective pipe ends, said end rings having thereon respective said conical surfaces.

14. A connection as claimed in claim 13, wherein each said end ring has thereon a second conical surface, and further comprising, for each pipe end, a centering flange having an inner conical surface complementary to and abutting said second conical surface of the respective said end ring, and means for pressing each said centering flange axially toward the respective pipe end.

15. A connection as claimed in claim 13, wherein said end rings are formed of material which is resistant to molten material passing through the pipes.

16. The improvement claimed in claim 1, wherein said sealing ring is formed of ceramic fiber material.

17. A connection as claimed in claim 9, wherein said sealing ring is formed of ceramic fiber material.

* * * * *